(12) United States Patent
Saegusa et al.

(10) Patent No.: US 9,290,602 B2
(45) Date of Patent: Mar. 22, 2016

(54) SURFACE PROTECTIVE FILM (71) Applicant: FUJI XEROX CO., LTD., Tokyo (JP)

(72) Inventors: Hiroshi Saegusa, Kanagawa (JP);
Tomoko Miyahara, Kanagawa (JP);
Kaoru Torikoshi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 104 days.

(21) Appl. No.: 14/189,218

(22) Filed: Feb. 25, 2014

(65) Prior Publication Data
US 2014/0296363 A1    Oct. 2, 2014

(30) Foreign Application Priority Data

Mar. 26, 2013  (JP) .................................. 2013-64976
Jan. 7, 2014   (JP) ................................. 2014-001189

(51) Int. Cl.
*C08F 2/46*     (2006.01)
*C08G 61/04*    (2006.01)
*C08F 290/06*   (2006.01)
*C08J 7/04*     (2006.01)
*C09D 171/00*   (2006.01)

(52) U.S. Cl.
CPC ............. *C08F 290/062* (2013.01); *C08J 7/047* (2013.01); *C09D 171/00* (2013.01); *C08G 2650/48* (2013.01); *C08J 2379/08* (2013.01); *C08J 2471/02* (2013.01)

(58) Field of Classification Search
CPC ...... C09D 7/1233; C09D 171/00; C08J 7/047; C08J 2379/08; C08J 2471/02; C08F 290/062; C08G 3650/48
USPC ................... 522/33, 6, 189, 184, 1, 71; 520/1
See application file for complete search history.

(56) References Cited

U.S. PATENT DOCUMENTS

| 2006/0292379 A1 | 12/2006 | Ishihara et al. | |
| 2012/0060903 A1* | 3/2012 | Fontana et al. | 136/251 |
| 2013/0053506 A1* | 2/2013 | Ohtaguro et al. | 524/544 |

FOREIGN PATENT DOCUMENTS

| JP | A-10-142990 | | 5/1998 |
| JP | A-2003-36002 | | 2/2003 |
| JP | A-2007-31690 | | 2/2007 |
| JP | A-2008-239722 | | 10/2008 |
| JP | A-2013-82888 | | 5/2013 |
| WO | 2010-016452 | * | 2/2010 |

* cited by examiner

*Primary Examiner* — Ling Choi
*Assistant Examiner* — Jessica E Whiteley
(74) *Attorney, Agent, or Firm* — Oliff PLC (57) ABSTRACT

A surface protective film includes a structure in which a fluorine resin having a perfluoroalkylene ether structure in a main chain is crosslinking polymerized, wherein a storage elastic modulus E' is in the range of 10 MPa to 1000 MPa at a temperature which is 40 K higher than a dynamic glass transition temperature Tg in dynamic viscoelasticity measurement at a measurement frequency of 10 Hz.

20 Claims, 5 Drawing Sheets

SURFACE PROTECTIVE FILM

CROSS-REFERENCE TO RELATED APPLICATIONS

This application is based on and claims priority under 35 USC 119 from Japanese Patent Application No. 2013-64976 filed Mar. 26, 2013 and Japanese Patent Application No. 2014-001189 filed Jan. 7, 2014.

BACKGROUND

1. Technical Field

The present invention relates to a surface protective film.

2. Related Art

In various fields, a surface protective film is provided on a surface from a viewpoint of suppressing scratches on the surface in the related art.

SUMMARY

According to an aspect of the invention, there is provide a surface protective film including a structure in which a fluorine resin having a perfluoroalkylene ether structure in a main chain is crosslinking polymerized, wherein a storage elastic modulus E' is in the range of 10 MPa to 1000 MPa at a temperature which is 40 K higher than a dynamic glass transition temperature Tg in dynamic viscoelasticity measurement at a measurement frequency of 10 Hz.

BRIEF DESCRIPTION OF THE DRAWINGS

Exemplary embodiments of the present invention will be described in detail based on the following figures, wherein.

DETAILED DESCRIPTION

Hereinafter, exemplary embodiments of a surface protective film of the present invention will be specifically described.

The surface protective film according to the exemplary embodiment includes a structure in which a fluorine resin having a perfluoroalkylene ether structure in a main chain is crosslinking polymerized, and a storage elastic modulus E' is in the range of 10 MPa to 1000 MPa at a temperature which is 40 K higher than a dynamic glass transition temperature Tg in dynamic viscoelasticity measurement at a measurement frequency of 10 Hz.

In addition, hereinafter, the storage elastic modulus E' at a temperature which is 40 K higher than the dynamic glass transition temperature Tg is referred to as a "storage elastic modulus $E'_{40}$."

In recent years, in various fields, self-repairing materials whose minute scratches are repaired with time have been attracting attention as a protective film. For example, self-repairing materials are practically used as a body or a screen of a portable terminal such as a smart phone, a mobile phone, or a portable game, a body of a vehicle, a glass window, a casing of a computer, a lens of glasses, a recording surface of an optical disc such as a CD, a DVD, or a BD, a solar battery panel or a panel reflecting sunlight, an endless belt or a roll for an image forming apparatus used for a fixing member, an intermediate transfer member, or a recording medium transport member in an image forming apparatus, and a protective film for a floor, a mirror, or window glass. In addition, with regard to the protective film used for the above-described uses, slipperiness (releasability) of a surface is necessary in addition to the damage repairing property in some cases from a viewpoint of finger slipperiness or a dust-proof property. However, the self-repairing materials satisfying both the damage repairing property and the surface slipperiness (releasability) are not easily realized.

On the contrary, in the surface protective film according to the exemplary embodiment, a fluorine resin having a perfluoroalkylene ether structure in a main chain is crosslinking polymerized and the storage elastic modulus $E'_{40}$ is controlled to be in the range of 10 MPa to 1000 MPa. By providing such a structure, the damage repairing property and the surface slipperiness (releasability) are achieved at the same time.

Here, a crosslinking density in a resin is a value calculated from the storage elastic modulus E' as described below, that is, the storage elastic modulus E' which may be obtained by the dynamic viscoelasticity measurement is a physical property which is an index of the crosslinking density in a resin.

The perfluoroalkyl ether with excellent releasability further has a characteristic of excellent flexibility, and is generally used as an oil such as a lubricant. It is considered that the self-repairing property is expressed in a fluorine resin by providing a structure in which the terminal of the main chain having a perfluoroalkylene ether structure with an excellent flexibility is fixed by crosslinking polymerization, and it is considered that an excellent damage repairing property is expressed by allowing the storage elastic modulus $E'_{40}$ which is an index of the crosslinking density to be controlled to be in the above-described range.

Storage Elastic Modulus $E'_{40}$

Moreover, the dynamic viscoelasticity measurement is an evaluation method involving measurement of viscosity and elasticity of a film by periodically applying minute deformation to the surface protective film, and also known as a method capable of evaluating the network state of a molecule or the like. The storage elasticity modulus E', the loss elasticity E", and the loss tangent tan δ may be calculated by the dynamic viscoelasticity measurement, and particularly, the peak of the loss tangent tan δ curve is defined as the dynamic glass transition temperature Tg in the dynamic viscoelasticity measurement. Further, the values are changed by the measured frequency, so these are defined as those measured at 10 Hz in the present specification.

The above-described dynamic viscoelasticity measurement is performed by measuring a sample of a surface protective film in a strip shape having dimensions of a length of 40 mm, a width of 4 mm, and a thickness of 0.5 mm using a dynamic viscoelasticity measuring apparatus DDV-01FP-W manufactured by A&D company, Ltd. as a measuring apparatus under the conditions of a tension mode, a distance between chucks of 30 mm, a temperature rising rate of 3° C./rain, and a frequency of 10 Hz at a set temperature of 25°

C. to 250° C. so as to examine the change of the storage elasticity modulus E' with respect to temperature, and the storage elasticity modulus $E'_{40}$ at a temperature which is 40 K higher than the dynamic glass transition temperature Tg that is, the peak of the loss tangent tan δ curve) is detected.

Figure 5:
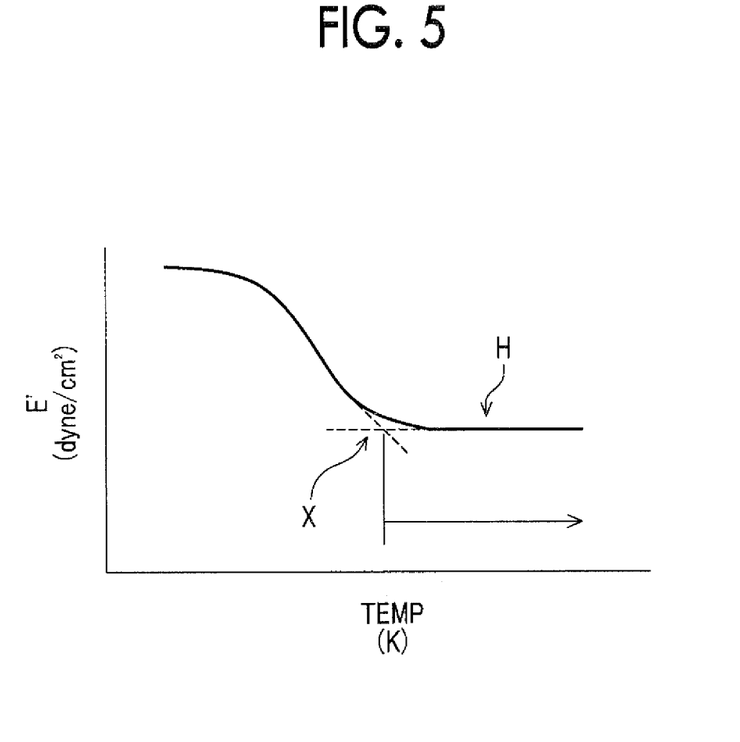
FIG. 5 is a graph illustrating changes in a storage elastic modulus E' with respect to temperature in dynamic viscoelasticity measurement.

Further, the reason for adopting a temperature 40 K higher than the dynamic glass transition temperature Tg as a condition of the temperature of the storage elasticity modulus E' to be calculated is as follows. The storage elasticity modulus E' of a crosslinkable resin generally has a constant range H in a temperature range as shown in FIG. 5 with respect to the temperature. In addition, it is known that the crosslinking density may be calculated from rubber elastic theory using the temperature at an intersection X of a tangent of a portion for which the maximum gradient of the storage elasticity modulus curve is obtained and an extended line of the constant range H, and the storage elasticity modulus at the temperature. However, depending on a resin, there is a case in which the above-described constant range H does not precisely appear as a straight line such that the storage elasticity modulus is constant at a specific temperature or higher, and in this case, it is difficult to calculate the crosslinking density from a temperature of the intersection X and the storage elasticity modulus at the temperature.

On the other hand, the temperature of the intersection X of the tangent of the portion for which the maximum gradient of the storage elasticity modulus curve is obtained and the extended line of the constant range H tends to be substantially equivalent to the temperature which is 40 K higher than the dynamic glass transition temperature Tg (that is, the peak of the loss tangent tan δ curve). In addition, the crosslinking density calculated from the temperature which is 40 K higher than the dynamic glass transition temperature Tg and the storage elasticity modulus $E'_{40}$ at the temperature is preferably used as an index representing the crosslinking state in the crosslinkable resin.

From the above-described reasons, the present specification adopts the temperature which is 40 K higher than the dynamic glass transition temperature Tg as a temperature condition of the storage elasticity modulus E' to be calculated.

The storage elasticity modulus $E'_{40}$ of the surface protective film according to the exemplary embodiment is in the range of 10 MPa to 1000 MPa. When the storage elasticity modulus $E'_{40}$ is below the above-described lower limit, the excellent damage repairing property may not be obtained because the self-repairing property is not expressed and also the excellent surface slipperiness may not be obtained. On the other hand, when the storage elasticity modulus $E'_{40}$ exceeds the above-described upper limit, the fracture damage in which the self-repairing hardly occurs is easily generated.

Further, the storage elasticity modulus $E'_{40}$ is more preferably in the range of 10 MPa to 800 MPa and still more preferably in the range of 20 MPa to 500 MPa.

The storage elasticity modulus $E'_{40}$ in the surface protective film may be controlled by adjusting the amount of a crosslinkable group. More specifically, a method of adjusting the number average molecular weight of a fluorine resin, the number of functional groups of a functional crosslinkable group in a case of modifying a terminal of a main chain of a fluorine resin, the number of functional groups of a crosslinking agent in a case of adding a crosslinking agent, and the like is exemplified.

Crosslinking Density

In the surface protective film according to the exemplary embodiment, it is preferable that the crosslinking density n calculated from Expression (A) below be 0.01 mol/cm³ or more.

$$n = E'(T)/3RT \qquad \text{Expression (A):}$$

In Expression (A), E' (T) represents the storage elastic modulus $E'_{40}$ (unit: dyne/cm²), and R represents the gas constant, and T represents a temperature (unit: K) which is 40 K higher than the dynamic glass transition temperature Tg.

Here, the value of the gas constant represented by R in Expression (A) above is $10^7$ dyne·cm/K·mol (=8.31 J/K·mol). Since the crosslinking density n (mol/cm³) is calculated using the gas constant, the unit of the storage elasticity modulus $E'_{40}$ which is substituted into E' (T) in Expression (A), which is used for calculation, is "dyne/cm²." In addition, 1 Pa is calculated as 9.8 dyne/cm².

By the crosslinking density n being in the above-described range, the excellent self-repairing property is expressed and the damage repairing property and the surface slipperiness become more excellent.

In addition, the above-described crosslinking density n is more preferably 0.02 mol/cm³ or more and still more preferably 0.1 mol/cm³ or more. Further, the upper limit thereof, which is not particularly limited, is preferably 10 mol/cm³ or less and more preferably 1 mol/cm³ or less.

The crosslinking density n in the surface protective film may be controlled by adjusting the amount of a crosslinkable group. More specifically, a method of adjusting the number average molecular weight of a fluorine resin, the number of functional groups of a functional crosslinkable group in a case of modifying a terminal of a main chain of a fluorine resin, the number of functional groups of a crosslinking agent in a case of adding a crosslinking agent, and the like is exemplified.

Self-Repairing Property

Here, the self-repairing property means a property of restoring distortion generated due to stress to the original shape at a time of removing the stress.

In addition, as an index of the self-repairing property, "a return rate (measured value at a temperature of 100° C.)" which is calculated by the measurement method described below is preferably 80% or more in the surface protective film according to the exemplary embodiment. Further, it is more preferable that the return rate be 90% or more and the closer the return rate to 100%, the more preferable it is.

Measurement of Return Rate

A Fischerscope HM2000 (manufactured by Fischer Corporation) is used as a measuring apparatus, the surface protective film of a sample formed by coating and polymerization on a polyimide film is fixed to a slide glass with an adhesive and applied to the above-described measuring apparatus. A load is applied to the sample of the surface protective film up to 0.5 mN over 15 seconds at 100° C. and is maintained at 0.5 mN for 5 seconds. The maximum displacement during this time is set to (h1). Subsequently, the load is removed down to 0.005 mN over 15 seconds, and the displacement at the time of being maintained at 0.005 mN for 1 minute is set to (h2), and then the return rate [(h1−h2)/h1] is calculated.

Martens Hardness

According to the exemplary embodiment, from a viewpoint of improving the damage repairing property, the Martens hardness of the surface protective film at 25° C. is preferably in the range of 5 N/mm² to 200 N/mm², more preferably in the range of 15 N/mm² to 150 N/mm², and still more preferably in the range of 20 N/mm² to 100 N/mm².

In addition, the measurement of the Martens hardness is performed using the following method.

A Fischerscope HM2000 (manufactured by Fischer Corporation) is used as a measuring apparatus, the surface protective film of a sample formed by coating and polymerization on a polyimide film is fixed to a slide glass with an adhesive and applied to the above-described measuring apparatus. A load is applied to the sample of the surface protective film up to 0.5 mN over 15 seconds at 25° C. and is maintained at 0.5 mN for 5 seconds, thereby obtaining the Martens hardness.

Composition of Surface Protective Film

Next, the composition of the surface protective film according to the exemplary embodiment will be described.

The surface protective film according to the exemplary embodiment is formed by crosslinking polymerization of a fluorine resin having a perfluoroalkylene ether structure in a main chain.

Fluorine Resin

The fluorine resin having the perfluoroalkylene ether structure in the main chain is used as a material of the surface protective film in the exemplary embodiment.

The fluorine resin having the perfluoroalkylene ether structure is not particularly limited, but a fluorine resin having at least one kind of structure selected from the structures represented by Formula (1) below is exemplified.

[Chem. 2]

Formula (1)

In Formula (1), $R^1$ and $R^2$ independently represent a fluorine atom or $-CF_3$ respectively, provided that both of $R^1$ and $R^2$ are not fluorine atoms. n1 represents an integer of 1 to 5, n2 represents an integer of 0 to 2, and the total of n1 and n2 is 5 or less.

n1 in Formula (1) is an integer of 1 to 5 as described above and is preferably in the range of 1 to 3.

n2 is an integer of 0 to 2 and is preferably in the range of 0 to 1.

The total of n1 and n2 is 5 or less, and is preferably in the range of 1 to 3.

In regard to the fluorine resin, a structure (constituent unit) other than the structure represented by Formula (1) may be included, and when another constituent unit is included, the weight ratio of the constituent unit represented by Formula (1) based on the entire constituent units is preferably at least 20% by weight or more and more preferably 50% by weight or more.

The fluorine resin having the structure represented by Formula (1) contains a hydroxyl group at the terminal generally. The terminal having the hydroxyl group may be modified with a functional crosslinkable group.

In addition, solubility in a solvent may be controlled by adjusting the kind or the amount of modification of a terminal modified crosslinkable group. Therefore, by increasing the solubility in a solvent using a terminal modified crosslinkable group, a coating liquid for forming the surface protective film with excellent manufacturability may be obtained.

Examples of the functional crosslinkable group which modifies the terminal may include an epoxy group, an acrylic group ($CH_2=CH-CO-$), a methacrylic group ($CH_2=C(CH_3)-CO-$), a hydroxyl group, an amino group, an ester group, a carboxyl group, a thiol group, a trialkoxysilyl group, and a group containing these groups.

In addition, among the above-described crosslinkable groups, an epoxy group, an acrylic group ($CH_2=CH-CO-$), and a methacrylic group ($CH_2=C(CH_3)-CO-$) are preferable from a viewpoint of improving the manufacturability of the protective film by increasing the solubility in a solvent.

In addition, from a viewpoint of further improving the damage repairing property by further increasing the crosslinking density, the number of the functional group of the terminal modified crosslinkable group is preferably in the range of 2 to 20 and more preferably in the range of 2 to 10. Among the crosslinkable groups, an acrylic group ($CH_2=CH-CO-$), a methacrylic group ($CH_2=C(CH_3)-CO-$), a hydroxyl group, or a group containing these groups is preferable from this viewpoint.

Further, it is preferable that the fluorine resin having the structure represented by Formula (1) in the main chain include a structure represented by Formula (1A) or (1B) below at the terminal of the main chain.

[Chem. 3]

Formula (1A)

Formula (1B)

In Formulae (1A) and (1B), $R^1$, $R^2$, n1, and n2 have the same definition as $R^1$, $R^2$, n1, and n2 in Formula (1). X represents groups represented by the structures of (a) to (d) below and Y represents the functional crosslinkable group. In addition, o in (d) below represents an integer of 1 or more.

[Chem. 4]

(a)

(b)

(c)

(d)

Here, specific examples of the fluorine resin having the structure represented by Formula (1) in the main chain are given. Firstly, as an example of the fluorine resin with a hydroxyl group at the terminal, the following structures are exemplified.

[Chem. 5]

(1-1)

(1-2)

(1-3)

In the fluorine resins of (1-1) to (1-8) above, X represents a group represented by the structures of (a) to (d) above, and n and m independently represent an integer of 1 or more respectively.

Moreover, the following structures are given as examples of the fluorine resin whose terminal is modified with a functional crosslinkable group. In addition, A in the following structures represents a portion formed by removing a terminal hydroxyl group in the fluorine resins of (1-1) to (1-8). R represents hydrogen, a methyl group, or a trifluoromethyl group.

Among these, the fluorine resins represented by the following structures are more preferable as the fluorine resin.

-continued

The number average molecular weight of the fluorine resin is preferably in the range of 200 to less than 4,000, more preferably in the range of 400 to 3,500, and still more preferably in the range of 450 to 3,000 from a viewpoint of controlling the storage elasticity modulus $E'_{40}$ to be in the above-described range.

In addition, the number average molecular weight of the fluorine resin is measured by the following method. It is measured with gel permeation chromatography GPC (polystyrene conversion molecular weight) using a tetrahydrofuran solution. Further, the measurement method for the state of the surface protective film is performed by heating and stirring the surface protective film in a mixed liquid of tetrahydrofuran, methanol, and a 50% sodium hydroxide aqueous solution, neutralizing the reaction liquid and performing extraction with an organic solvent, and then the concentrated residue is measured by GPC using the above-described method.

Crosslinking Agent

In the surface protective film according to the exemplary embodiment, the fluorine resin may be crosslinking polymerized through a crosslinking agent. In addition, for example, when a fluorine resin with a terminal modified with an acrylic group is used as the above-described fluorine resin, crosslinking polymerization may be performed without using a crosslinking agent. However, particularly, when a fluorine resin with a hydroxyl group at the terminal or with a terminal modified with an epoxy group, an amino group, or a carboxyl group is used as the fluorine resin, a crosslinking agent is used as a curing agent or an epoxy group modified fluorine resin is mixed with a fluorine resin modified with an amino group, a hydroxyl group, or a carboxyl group and then used.

The crosslinking agent which may be used when the terminal of the fluorine resin is modified with an epoxy group may include pentaerythritol, dipentaerythritol, tripentaerythritol, polycarbonate diol, or polyether diol, or tris(2-hydroxyethyl) isocyanurate.

As the crosslinking agent which may be used when the terminal of the fluorine resin is modified with an acrylic group, a crosslinking agent containing 2 or more acrylic groups is preferable. Examples thereof may include 2-hydroxy-3-acryloyloxypropyl methacrylate, polyethylene glycol diacrylate, tricyclodecane dimethanol diacrylate, 1,10-decanediol diacrylate, 1,6-hexanediol diacrylate, tripropylene glycol diacrylate, ethoxylated isocyanuric acid triacrylate, ε-caprolactone modified tris-(2-acryloxyethyl) isocyanurate, pentaerythritol triacrylate, trimethylolpropane triacrylate, ditrimethylolpropane tetraacrylate, ethoxylated pentaerythritol tetraacrylate, pentaerythritol tetraacrylate, dipentaerythritol polyacrylate, or dipentaerythritol hexaacrylate.

As the crosslinking agent which may be used when the terminal of the fluorine resin is a hydroxyl group, an amino group, or a carboxyl group, a crosslinking agent containing 2 or more epoxy groups is preferable. Examples thereof may include 1,5-hexadiene diepoxide, 1,7-octadiene diepoxide, neopentyl glycol diglycidyl ether, diglycidyl 1,2-cyclohexanedicarboxylate, 2,2-bis(4-glycidyloxyphenyl)propane, triglycidyl isocyanurate, or 1,6-bis(2,3-epoxypropoxy)naphthalene.

The amount added to the fluorine resin in a case of using a crosslinking agent is preferably adjusted to be in the range of 1% to 500% and more preferably in the range of 5% to 200% with respect to the weight of the fluorine resin.

Method of Forming Surface Protective Film (Method of Crosslinking Polymerization)

The surface protective film according to the exemplary embodiment is formed by coating a coating liquid containing at least the fluorine resin on a base material to be crosslinking polymerized. In addition, when a liquid fluorine resin is used as the fluorine resin, the fluorine resin may be used as the coating liquid as is. When a fluorine resin which may be dissolved in a solvent, regardless of whether being a solid or a liquid, is used as the fluorine resin, the surface protective film is formed by dissolving the fluorine resin, a curing agent (crosslinking agent) if the curing agent is needed, another additive, and the like in a solvent to prepare a coating liquid, and coating the coating liquid on a base material to be crosslinking polymerized.

Further, when a fluorine resin which is a solid and does not dissolve in a solvent is used as the fluorine resin, the surface protective film is formed by heating the fluorine resin, a curing agent (crosslinking agent) if the curing agent is needed, another additive, and the like up to a temperature at which the fluorine resin, the curing agent, another additive, and the like may be dissolved, and then performing crosslinking polymerization of the fluorine resin.

However, in terms of manufacturability, it is preferable that a surface protective film be formed using a fluorine resin which may be dissolved in a solvent or a fluorine resin which is a liquid state at room temperature.

Examples of the solvent used for the coating liquid may include acetone, methyl ethyl ketone, methyl butyl ketone, methyl isobutyl ketone, cyclopentanone, cyclohexanone, ethyl acetate, propyl acetate, isopropyl acetate, butyl acetate, isobutyl acetate, amyl acetate, toluene, xylene, hexane, heptane, 1,4-dioxane, tetrahydrofuran, ethylene glycol monomethyl ether, ethylene glycol monoethyl ether, ethylene glycol monobutyl ether, ethylene glycol monoethyl ether acetate, methanol, ethanol, 1-propanol, 2-propanol, 1-butanol, and tetrahydrofuran.

While the fluorine resin is crosslinking polymerized, energy may be supplied from the outside, and the energy is supplied by a unit for irradiating with ultraviolet rays, a unit for irradiating with electron beams, a heating unit, or the like.

Further, a polymerization initiator for performing crosslinking polymerization of the fluorine resin may be added. Specific examples of the polymerization initiator may include IRGACURE 184, IRGACURE 651, IRGACURE 123, IRGACURE 819, DAROCURE 1173, IRGACURE 784, IRGACURE OXE 01, and IRGACURE OXE 02 as radical types; and IRGACURE 250 and IRGACURE 270 as cation types (all manufactured by BASF Japan Ltd.).

Amount of Crosslinkable Group

Further, it is preferable that the amount of the crosslinkable group of the surface protective film according to the exemplary embodiment obtained by the above-described method be adjusted to be in the range of 0.50 mmol/g or more. The amount of the crosslinkable group is more preferably 0.60 mmol/g or more and still more preferably 0.70 mmol/g or more. In addition, the upper limit thereof, which is not particularly limited, is preferably 10 mmol/g or less and more preferably 5 mmol/g or less.

As the method of controlling the amount of the crosslinkable group, a method of adjusting the number average molecular weight of a fluorine resin, the number of functional groups of a functional crosslinkable group in a case of modifying a terminal of a main chain of a fluorine resin, the number of functional groups of a crosslinking agent in a case of adding the crosslinking agent, or the like is exemplified. That is, the amount of the crosslinkable group increases as the number average molecular weight of a fluorine resin becomes lower, and the amount of the crosslinkable group increases as the number of functional groups of a functional crosslinkable group or the number of functional groups of a crosslinking agent becomes higher.

In addition, the amount of the crosslinkable group is controlled by the amount of energy supplied from the outside such as ultraviolet rays, the type or the amount of a polymerization initiator in a case of adding the same, or reduction of influence of oxygen at the time of curing.

In addition, the amount of the crosslinkable group is calculated by the amount of each composition (the fluorine resin or crosslinking agent) used for polymerization of the surface protective film and the number of the crosslinkable group in the composition.

Physical Property of Surface Protective Film

The contact angle with water at 25° C. of the surface protective film according to the exemplary embodiment is preferably 90° or more and more preferably 100° or more.

Further, the measurement of the contact angle may be performed on a sample of the surface protective film coated on a film with a contact angle meter using water by a θ/2 method at 25° C. In addition, the contact angle with respect to hexadecane described below is measured by changing the water to hexadecane.

The thickness of the surface protective film, which is not particularly limited, is preferably in the range of 1 μm to 500 μm and more preferably in the range of 10 μm to 50 μm.

Use

The surface protective film according to the exemplary embodiment, which may be obtained as described above, may be used without particular limitation as long as the surface protective film is used for a material in which scratches may be generated on the surface due to contact with a foreign substance. Examples of the material in which scratches may be generated on the surface due to contact with a foreign substance may include a body or a screen in a portable terminal such as a smart phone, a mobile phone, or a portable game, a body of a vehicle, a glass window, a casing of a computer, a lens of glasses, a recording surface of an optical disc such as a CD, a DVD, or a BD, a solar battery panel or a panel reflecting sunlight, an endless belt or a roll for an image forming apparatus used for a fixing member, an intermediate transfer member, or a recording medium transport member in an image forming apparatus, a floor, a mirror, or window glass.

In a portable terminal such as a smart phone, a mobile phone, or a portable game, a body or a screen may be scratched by being brought into contact with and rubbed by a finger-tip (nail) or a tip of a stylus for operation.

Further, in window glass, or window glass or a body of a vehicle, because of exposure to the outdoor environment, scratches may be made due to various reasons such as contact with sand, leaves, branches of trees carried by wind or contact with insects.

Further, fine particles (dirt) may adhere to the surface of a lens of glasses, so scratches are made due to dry-wiping of the surface in some cases.

In a recording surface or the like of an optical disc such as a CD, a DVD, or a BD, scratches may be made due to contact with a corner of a case when an optical disc is taken in and out of the case, contact with a corner of an apparatus when an optical disc is taken in and out of a reproducing apparatus or a recording apparatus, contact with a finger-tip (nail), and friction with these.

In a panel reflecting sunlight or a solar battery panel, because of exposure to the outdoor environment, scratches may be made due to various reasons such as contact with sand, leaves, branches of trees carried by wind or contact with insects.

In an endless belt or a roll for an image forming apparatus used for a fixing member, an intermediate transfer member, a recording medium transport member, or the like in an image forming apparatus, scratches may be made due to contact with a recording medium such as paper in an image forming apparatus, contact with another member, and friction with these.

Further, in addition to the above-described aspects, when a surface of a material may come in contact with a foreign substance, scratches may be made on the surface due to friction with the foreign substance.

Scratches generated due to contact with foreign substances are effectively repaired by providing the surface protective film according to the exemplary embodiment on the surface of a material contacting foreign substances.

Endless Belt

An endless belt for an image forming apparatus according to the exemplary embodiment includes a belt-like base material and the surface protective film according to the exemplary embodiment, which is provided on the belt-like base material.

Figure 1:
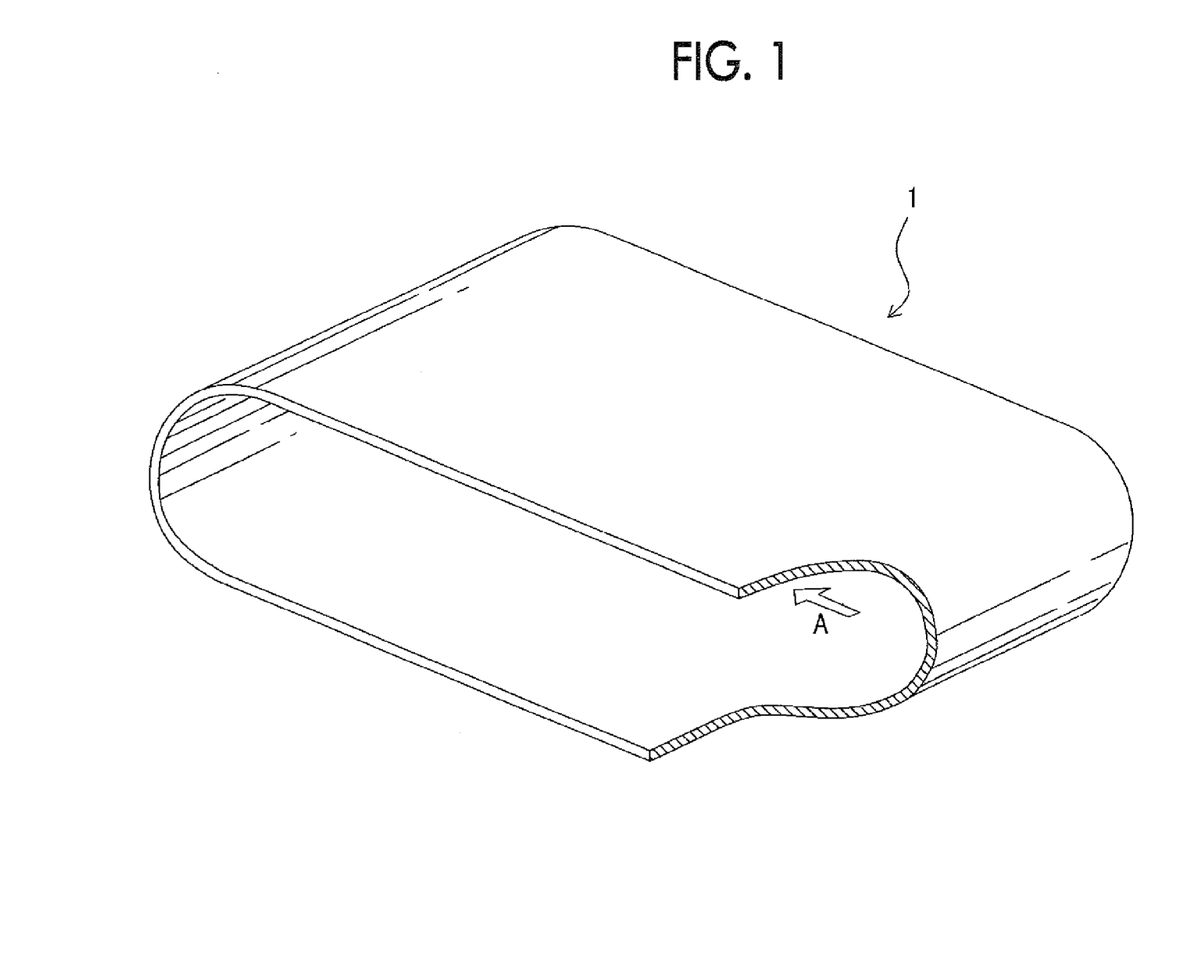
FIG. 1 is a perspective view schematically illustrating a configuration of an endless belt according to an exemplary embodiment.
Figure 2:
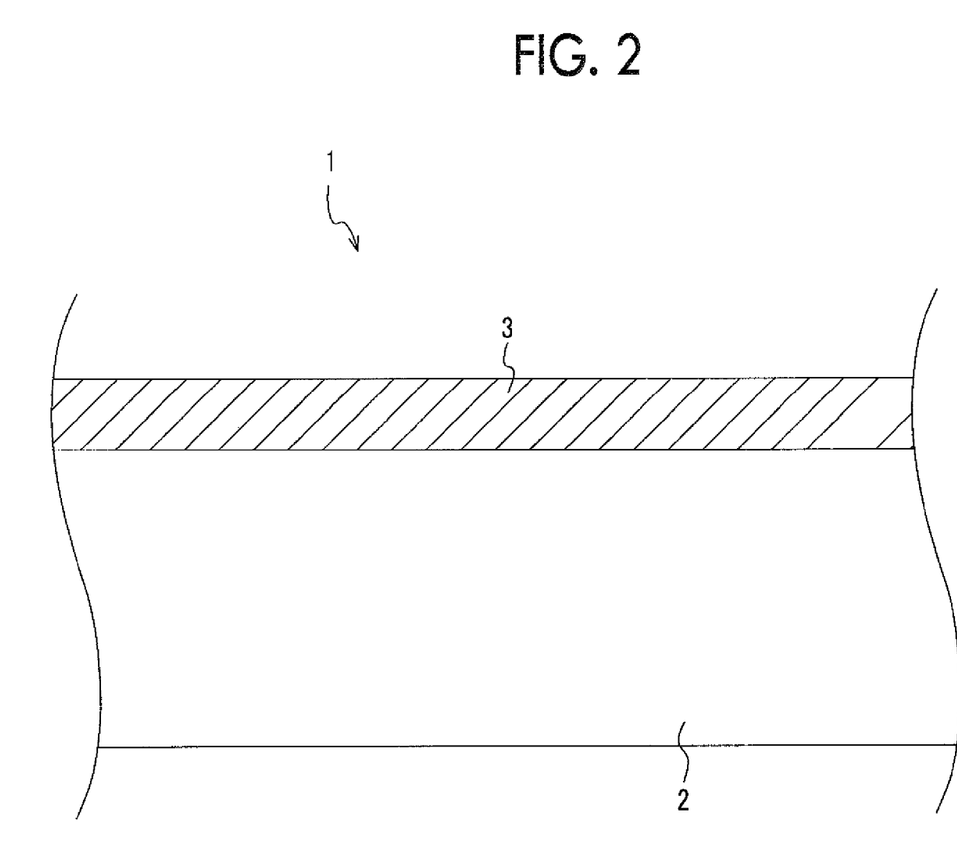
FIG. 2 is a cross-sectional view of the endless belt according to the exemplary embodiment.

FIG. 1 is a perspective view (partly, illustrated with a cross-section) illustrating the endless belt according to the exemplary embodiment and FIG. 2 is a cross-sectional view of the endless belt seen from the direction of the arrow A in FIG. 1.

As shown in FIGS. 1 and 2, an endless belt 1 of the exemplary embodiment is an endless belt including a base material 2 and a surface layer 3 laminated on the surface of the base material 2.

In addition, the surface protective film according to the exemplary embodiment is applied as the surface layer 3.

The endless belt 1 may be used for a fixing belt, an intermediate transfer belt, or a recording medium transport belt in an image forming apparatus.

Hereinafter, the case of using the endless belt 1 as a fixing belt will be described.

The material used for the base material 2 is preferably heat resistant, and specifically, is selected from various known plastic materials and metal materials and used.

Among plastic materials, engineering plastic is generally appropriate, and, for example, a fluorine resin, polyimide (PI), polyamideimide (PAI), polybenzimidazole (PBI), polyether ether ketone (PEEK), polysulfone (PSU), polyether sulfone (PES), polyphenyl sulfide (PPS), polyetherimide (PEI), or a wholly aromatic polyester (liquid crystal polymer) is preferable. In addition, among these, thermosetting polyimide, thermoplastic polyimide, polyamideimide, polyetherimide, or a fluorine resin which has an excellent mechanical strength, heat resistance, abrasion resistance, and chemical resistance are preferable.

In addition, various metals or alloy materials such as SUS, nickel, copper, aluminum, and iron are preferably used as the metal material used for the base material 2, which is not particularly limited. Further, the heat resistant resin or the metal material may be laminated in plural.

Hereinafter, the case in which the endless belt 1 is used as an intermediate transfer belt or a recording medium transport belt is described.

Examples of the material used for the base material 2 may include a polyimide-based resin, a polyamideimide-based resin, a polyester-based resin, a polyamide-based resin, and a fluorine-based resin, and among these, a polyimide-based resin and a polyamideimide-based resin are more preferably used. In addition, when the base material is annular (endless), joints may be or may not be included, and the thickness of the base material 2 is preferably 0.02 mm to 0.2 mm.

In the case in which the endless belt 1 is used as an intermediate transfer belt or a recording medium transport belt of an image forming apparatus, it is preferable to control surface resistivity to be in the range of $1 \times 10^9 \Omega/\square$ to $1 \times 10^{14} \Omega/\square$ and volume resistivity to be in the range of $1 \times 10^8$ $\Omega$cm to $1 \times 10^{13}$ $\Omega$cm. For this reason, as described above, it is preferable to add carbon black such as Ketjen black or acetylene black; graphite; metal or an alloy such as aluminum, nickel, or a copper alloy; metal oxides such as tin oxide, zinc oxide, potassium titanate, tin oxide-indium oxide or a tin oxide-antimony oxide complex oxide; or a conductive polymer such as polyaniline, polypyrrole, polysulfone, or polyacetylene to the base material 2 or the surface layer 3 as a conductive material (here, the term "conductive" in the polymer means that the volume resistivity is less than $10^7$ $\Omega$·cm). These conductive materials may be used alone or in combination of two or more kinds thereof.

Here, the surface resistivity and the volume resistivity may be measured in conformity with JIS-K6911 using a Hiresta UPMCP-450 type UR probe manufactured by Dia Instruments Co., Ltd. under the environment of 55% RH at 22° C.

In the case of being used for fixing, the endless belt 1 may include an elastic layer between the base material 2 and the surface layer 3. As the material of the elastic layer, for example, various rubber materials may be used. Examples of the various rubber materials may include urethane rubber, ethylene-propylene rubber (PPM), silicone rubber, and fluororubber (FKM), and among these, silicone rubber having excellent heat resistance and workability is preferable. Examples of the silicone rubber may include RTV silicone rubber and HTV silicone rubber, and specific examples thereof may include polydimethyl silicone rubber (MQ), methyl vinyl silicone rubber (VMQ), methyl phenyl silicone rubber (PMQ), and fluorosilicone rubber (FVMQ).

When the endless belt 1 is used as a fixing belt in a fixing device of an electromagnetic induction system, a heat generation layer may be provided between the base material 2 and the surface layer 3.

Examples of the material used for the heat generation layer may include non-magnetic metals, and specific examples thereof may include metal materials such as gold, silver, copper, aluminum, zinc, tin, lead, bismuth, beryllium, antimony, and an alloy thereof (alloy containing these metals).

The film thickness of the heat generation layer is preferably in the range of 5 μm to 20 μm, more preferably in the range of 7 μm to 15 μm, and particularly preferably in the range of 8 μm to 12 μm.

Roll

A roll of an image forming apparatus according to the exemplary embodiment includes a cylindrical base material and the surface protective film according to the exemplary embodiment, which is provided on the cylindrical base material.

Next, the roll according to the exemplary embodiment will be described. The roll of the exemplary embodiment is a cylindrical roll including a base material and a surface layer laminated on the surface of the base material.

Further, the surface protective film according to the exemplary embodiment is applied as the surface layer.

The cylindrical roll may be used as, for example, a fixing roll, an intermediate transfer roll, or a recording medium transport roll in an image forming apparatus.

Hereinafter, the case in which a cylindrical roll is used as a fixing roll is described.

Figure 4:
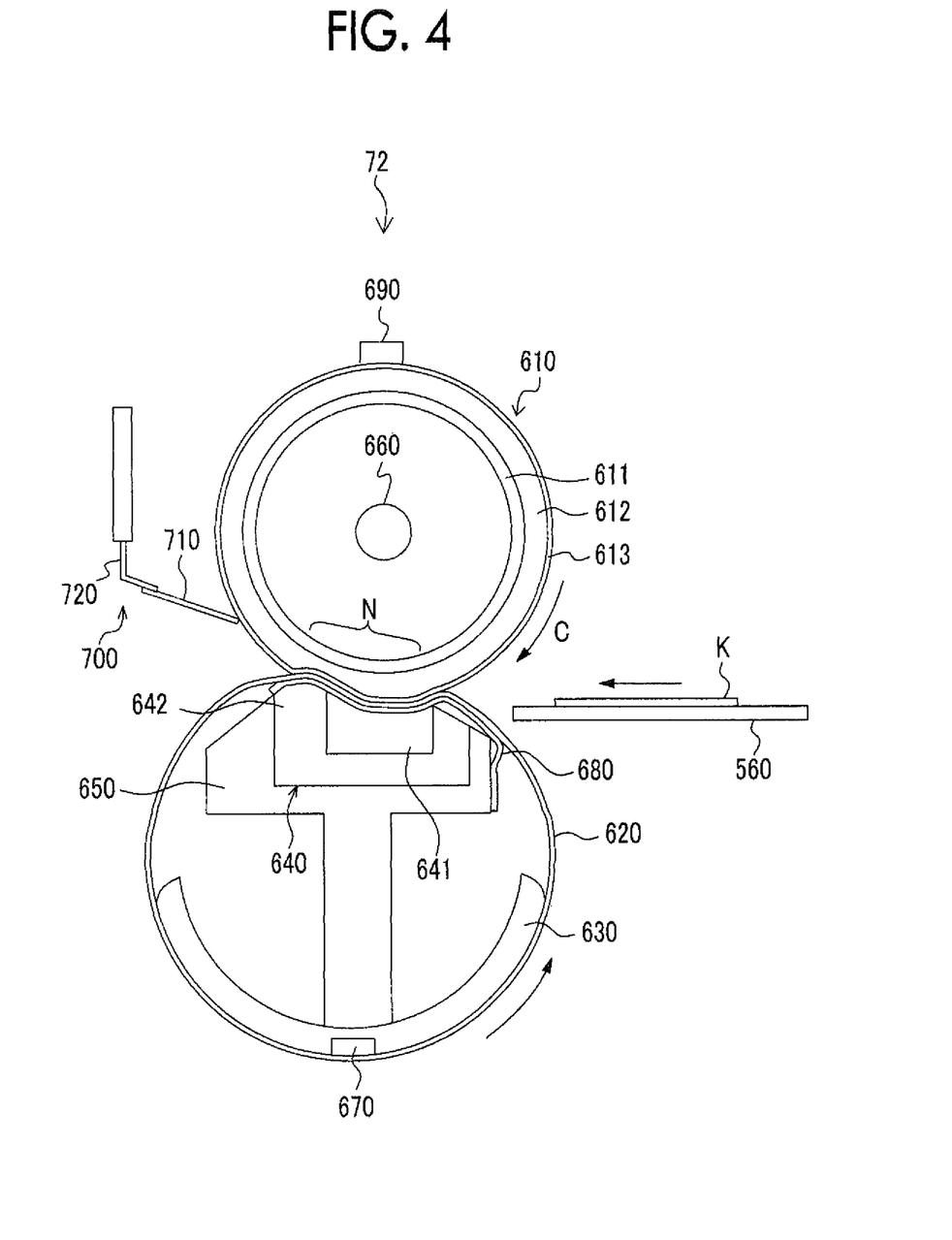
FIG. 4 is a schematic configuration diagram illustrating an image fixing device using the endless belt according to the exemplary embodiment.

In regard to a fixing roll 610 as a fixing member shown in FIG. 4, the shape, the structure, and the size thereof are not particularly limited, and the fixing roll is provided with a surface layer 613 on a cylindrical core 611. Further, as shown in FIG. 4, an elastic layer 612 may be provided between the core 611 and the surface layer 613.

Examples of the material of the cylindrical core 611 may include metals such as aluminum (for example, an A-5052 material), SUS, iron, and copper, an alloy, ceramics, and FRM. In a fixing device 72 according to the exemplary embodiment, the cylindrical core is formed of a cylindrical member having dimensions of an outer diameter of φ25 mm, a thickness of 0.5 mm, and a length of 360 mm.

The material of the elastic layer 612 is selected from known materials, but any material may be used as long as the material is an elastic member having high heat resistance. Particularly, it is preferable to use an elastic member such as rubber or an elastomer having a rubber hardness of approximately 15° to 45° (JIS-A), and examples thereof may include silicone rubber and fluororubber.

In the exemplary embodiment, among these materials, silicone rubber is preferable in terms of small surface tension and excellent elasticity. Examples of the silicone rubber may include RTV silicone rubber and HTV silicone rubber, and specific examples thereof may include polydimethyl silicone rubber (MQ), methylvinyl silicone rubber (VMQ), methylphenyl silicone rubber (PMQ), and fluorosilicone rubber (FVMQ).

In addition, the thickness of the elastic layer 612 is preferably 3 mm or less and more preferably in the range of 0.5 mm to 1.5 mm. A core of the fixing device 72 is coated with HTV silicone rubber having a rubber hardness of 35° (JIS-A) with a thickness of 72 μm.

The thickness of the surface layer 613 is, for example, in the range of 5 μm to 50 μm or may be in the range of 10 μm to 30 μm.

As a heating source for heating the fixing roll 610, for example, a halogen lamp 660 may be used. The heating source is not particularly limited as long as the heating source has a shape and a structure of being accommodated inside the core 611 and selected depending on the purposes. The surface temperature of the fixing roll 610 heated by the halogen lamp 660 is measured by a thermosensitive element 690 provided in the fixing roll 610, and the temperature is controlled by a controller. Examples of the thermosensitive element 690, which is not particularly limited, may include a thermistor and a temperature sensor.

Image Forming Apparatus

Figure 3:
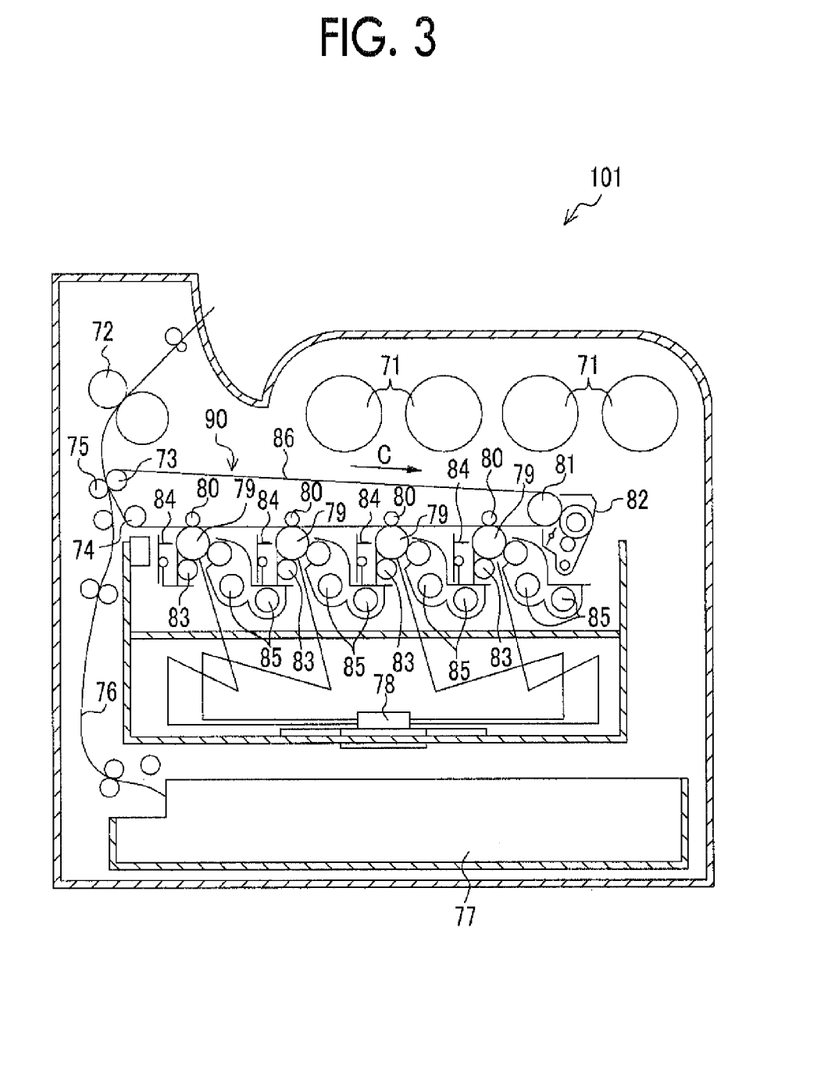
FIG. 3 is a schematic configuration diagram illustrating an image forming apparatus using the endless belt according to the exemplary embodiment.

Next, an image forming apparatus of the exemplary embodiment, using the endless belt of the exemplary embodiment and the roll of the exemplary embodiment will be described. FIG. 3 is a schematic view describing a main part of a tandem image forming apparatus including the endless belt according to the exemplary embodiment as a pressure belt of a fixing device, the endless belt according to the exemplary embodiment as an intermediate transfer belt, and the roll according to the exemplary embodiment as a fixing roll of a fixing device.

Specifically, an image forming apparatus 101 is configured to include a photoreceptor 79 (electrostatic latent image holding member), a charging roll 83 electrically charging the surface of the photoreceptor 79, a laser generating device (electrostatic latent image forming unit) exposing the surface of the photoreceptor 79 and forming an electrostatic latent image, a developing device 85 (developing unit) developing a latent image formed on the surface of the photoreceptor 79 using a developer to form a toner image, an intermediate transfer belt 86 (intermediate transfer member) in which the toner image formed by the developing device 85 is transferred from the photoreceptor 79, a primary transfer roll 80 (primary transfer unit) which transfers the toner image to the intermediate transfer belt 86, a photoreceptor cleaning member 84 removing toner or dust adhered to the photoreceptor 79, a secondary transfer roll 75 (secondary transfer unit) which transfers the toner image on the intermediate transfer belt 86 to a recording medium, and a fixing device 72 (fixing unit) fixing the toner image on the recording medium. The photoreceptor 79 and the primary transfer roll 80 may be disposed just above the photoreceptor 79 as shown in FIG. 3 or on a position deviated from the position just above the photoreceptor 79.

Further, the constitution of the image forming apparatus 101 shown in FIG. 3 will be specifically described.

In regard to the image forming apparatus 101, a charging roll 83, a developing device 85, and the primary transfer roll 80 disposed via an intermediate transfer belt 86 and the photoreceptor cleaning member 84 are disposed around the photoreceptor 79 in a counterclockwise direction, and the set of members forms developing units corresponding to one color. In addition, toner cartridges 71 which replenish the developing device 85 with a developer are respectively provided on each of the developing units and a laser generating device 78 which irradiates with a laser beam according to image information on the surface of the photoreceptor 79 on the upstream side of the developing device 85 which is the downstream side (rotation direction of the photoreceptor 79) of the charging roll 83 with respect to the photoreceptor 79 of each of the developing units is provided.

Four developing units corresponding to four colors (for example, cyan, magenta, yellow, black) are serially disposed in the image forming apparatus 101 in the horizontal direction and the intermediate transfer belt 86 is disposed such that the intermediate transfer belt is inserted in a transfer range between the photoreceptor 79 and the primary transfer roll 80 of each of four developing units. The intermediate transfer belt 86 is supported by a support roll 73, a support roll 74, and a driving roll 81 which are provided in the inner surface side in the order described above in the counterclockwise direction to form a belt support apparatus 90. Further, four primary transfer rolls are positioned on the upstream side of the support roll 74 which is on the downstream side of the support roll 73 (rotation direction of the intermediate transfer belt 86). Furthermore, a transfer cleaning member 82 cleaning the outer peripheral surface of the intermediate transfer belt 86 is provided such that the transfer cleaning member 82 comes into contact with the driving roll 81 on the opposite side of the driving roll 81 via the intermediate transfer belt 86.

The secondary transfer roll used for transferring a toner image formed on the outer peripheral surface of the intermediate transfer belt 86 is provided such that the secondary transfer roll 75 comes into contact with the support roll 73 on the surface of recording paper fed via a paper path 76 from a paper supplying unit 77 on the opposite side of the support roll 73 via the intermediate transfer belt 86.

Further, the paper supplying unit 77 accommodating a recording medium is provided at the bottom of the image forming apparatus 101 and the recording medium is supplied such that the recording medium is passed through the contact portion of the secondary transfer roll 75 and the support roll 73 constituting a secondary transfer unit via the paper path 76 from the paper supplying unit 77. The recording medium passed through the contact portion is fed by a transport unit (not shown) such that the recording medium is inserted in the contact portion of the fixing device 72, and is eventually discharged to the outside of the image forming apparatus 101.

Next, an image forming method using the image forming apparatus 101 shown in FIG. 3 will be described. The formation of a toner image is performed by each of the developing units, and a latent image (electrostatic latent image) is formed on the surface of the photoreceptor 79 charged by the laser generating device 78 (exposure apparatus) after the surface of the photoreceptor 79 rotated by the charging roll 83 in the counterclockwise direction is charged, and a toner image is formed by developing the latent image with a developer supplied from the developing device 85, and then the toner image carried into the contact portion of the primary transfer roll 80 and the photoreceptor 79 is transferred to the outer peripheral surface of the intermediate transfer belt 86 rotating in an arrow C direction. In addition, the toner or dust adhered to the surface of the photoreceptor 79 after the toner image is transferred is cleaned off by the photoreceptor cleaning member 84 in order to prepare for the next formation of the toner image.

The toner image developed by each of the developing units with each color is transferred to the surface of the recording paper which is fed via the paper path 76 from the paper supplying unit 77 by the secondary transfer roll 75 after being carried into the secondary transfer unit in a state of being sequentially laminated on the outer peripheral surface of the intermediate transfer belt 86 so as to correspond to the image information. The recording paper with the toner image having been transferred is fixed by being pressed and heated when the recording paper is passed through the contact portion of the fixing device 72, and discharged to the outside of the image forming apparatus after the image is formed on the surface of the recording medium.

Fixing Device (Image Fixing Device)

FIG. 4 is a schematic configuration diagram of the fixing device 72 provided in the image forming apparatus 101 according to the exemplary embodiment. The fixing device 72 shown in FIG. 4 is configured to include a fixing roll 610 as a rotating member which is rotationally driven, an endless belt 620 (pressure belt), and a pressure pad 640 as a pressure member which presses the fixing roll 610 via the endless belt 620. Further, the endless belt 620 and the fixing roll 610 may be relatively pressed by the pressure pad 640. Accordingly, the endless belt 620 side may be pressed against the fixing roll 610 and the fixing roll 610 side may be pressed against the endless belt 620.

The halogen lamp 660 is arranged inside the fixing roll 610 as an example of the heating unit heating an unfixed toner image in a nipping region. As the heating unit, which is not limited to the halogen lamp, another heat-generating member generating heat may be used.

On the other hand, the thermosensitive element 690 is disposed such that the thermosensitive element comes into contact with the surface of the fixing roll 610. Lighting of the halogen lamp 660 is controlled and the surface temperature of the fixing roll 610 is maintained to a preset temperature (for example, 150° C.) based on the value of the temperature measured by the thermosensitive element 690.

The endless belt 620 is rotatably supported by the pressure pad 640 disposed therein, a belt running guide 630, and an edge guide (not shown). In addition, the endless belt 620 is disposed such that the endless belt comes in contact with the fixing roll 610 in a nipping region N in a state of being pressed against the fixing roll 610.

The pressure pad 640 is disposed inside the endless belt 620 in a state of being pressed against the fixing roll 610 via the endless belt 620 and forms the nipping region N with the fixing roll 610. The pressure pad 640 disposes a pre-nipping member 641 for ensuring the wide nipping region N at the entrance side of the nipping region N and disposes a peeling and nipping member 642 for applying distortion to the fixing roll 610 at the exit side of the nipping region N.

In addition, a low friction sheet 680 is provided on a surface of the pre-nipping member 641 and the peeling and nipping member 642 in contact with the endless belt 620 in order to reduce sliding resistance between the inner peripheral surface of the endless belt 620 and the pressure pad 640. In addition, the pressure pad 640 and the low friction sheet 680 are supported by a metal holder 650.

In addition, the belt running guide 630 is attached to the holder 650 and the endless belt 620 is configured to smoothly rotate. That is, the belt running guide 630 is formed by a material having a small static friction coefficient because the belt running guide is rubbed against the inner peripheral surface of the endless belt 620. Further, the belt running guide 630 is formed of a material having a low thermal conductivity such that heat removal from the endless belt 620 is difficult.

In addition, the fixing roll 610 rotates in an arrow C direction due to a driving motor (not shown), and the endless belt 620 follows the rotation of the fixing roll 610 and rotates in the direction opposite to the rotation direction of the fixing roll 610. In other words, the endless belt 620 rotates in the counterclockwise direction while the fixing roll 610 rotates in the clockwise direction in FIG. 4.

Paper K having an unfixed toner image is fed to the nipping region N by being guided by a fixing entrance guide 560. Further, when the paper K passes through the nipping region N, the toner image on the paper K is fixed by the pressure applied to the nipping region N and the heat supplied from the fixing roll 610.

In the fixing device 72, the nipping region N is ensured by the concave shaped pre-nipping member 641 which follows the outer peripheral surface of the fixing roll 610.

Further, the fixing device 72 according to the exemplary embodiment has a configuration in which local distortion of the fixing roll 610 becomes large in the exit region of the nipping region N by disposing the peeling and nipping member 642 to protrude with respect to the outer peripheral surface of the fixing roll 610. The paper K after the fixation is peeled from the fixing roll 610 due to the configuration.

In addition, as an auxiliary unit of peeling, a peeling member 700 is arranged at the downstream side of the nipping region N of the fixing roll 610. The peeling member 700 is supported by a holder 720 in a state in which a peeling baffle 710 is adjacent to the fixing roll 610 in an opposite direction (counter direction) of the rotation direction of the fixing roll 610.

Portable Devices

The surface protective film according to the exemplary embodiment may be used as a protective film in a screen or the like displaying an image in a portable terminal (portable device).

A screen (for example, liquid crystal screen) or the like in a portable terminal (portable device) such as a smart phone, a mobile phone, or a portable game, may be scratched by contact with a finger-tip (nail) during operation or contact and rubbing with a tip of a stylus when there is a stylus for operation. On the other hand, the generation of scratches (permanent damage) which permanently remain on the surface may be effectively suppressed because even when scratches are generated, the scratches are repaired by including the surface protective film according to the exemplary embodiment as a protective film.

Window Glass and Body of Vehicle

The surface protective film according to the exemplary embodiment may be used as a protective film of window glass in a building or a vehicle. The surface protective film according to the exemplary embodiment may be used as a protective film of a body of a vehicle.

In window glass of a building, or window glass or a body of a vehicle, because of exposure to the outdoor environment, scratches may be made due to various reasons such as contact with sand, leaves, branches of trees carried by wind or contact with insects. On the other hand, the generation of scratches (permanent damage) which permanently remain on the surface may be effectively suppressed because, even when scratches are generated, the scratches are repaired by including the surface protective film according to the exemplary embodiment as a protective film.

Lens of Glasses

The surface protective film according to the exemplary embodiment may be used as a protective film of a lens of glasses.

Fine particles (dirt) may adhere to the surface of a lens of glasses, so scratches may be made due to dry-wiping of the surface. On the other hand, the generation of scratches (permanent damage) which permanently remain on the surface may be effectively suppressed because even when scratches are generated, the scratches are repaired by including the surface protective film according to the exemplary embodiment.

Optical Disc

The surface protective film according to the exemplary embodiment may be used as a protective film of a recording surface of an optical disc.

In a recording surface or the like of an optical disc such as a CD, a DVD, or a BD, scratches may be made due to contact with a corner of a case when an optical disc is taken in and out of the case, contact with a corner of an apparatus when an optical disc is taken in and out of a reproducing apparatus or a recording apparatus, contact with a finger-tip (nail), or friction with these. As a result, reading errors occur in some cases due to scratches generated on a recording surface. On the other hand, the generation of scratches (permanent damage) which permanently remain on the surface may be effectively suppressed because even when scratches are generated, the scratches are repaired by including the surface protective film according to the exemplary embodiment as a protective film. As a result, the generation of the reading errors is effectively suppressed.

Solar Light Panel

The surface protective film according to the exemplary embodiment may be used as a protective film of a reflection surface of a solar light panel.

In a panel reflecting sunlight or a solar battery panel, because of exposure to the outdoor environment, scratches may be made due to various reasons such as contact with sand, leaves, branches of trees carried by wind or contact with insects. On the other hand, the generation of scratches (permanent damage) which permanently remain on the surface may be effectively suppressed because even when scratches are generated, the scratches are repaired by including the surface protective film according to the exemplary embodiment as a protective film.

EXAMPLES

Hereinafter, the present invention will be specifically described with reference to examples, but the present invention is not limited to the examples described below. Further, hereinafter, "parts" and "%" are on a weight basis unless otherwise noted.

Example 1

Preparation of Coating Liquid for Forming Surface Protective Film

A coating liquid is prepared by mixing the following compositions.

Fluorine resin having a perfluoroalkylene ether structure in the main chain (trade name: MT70, manufactured by Solvay Chemicals, structure/main chain: copolymerization of a unit (n1=1 and n2=0 in Formula (1)) and a unit (n1=2 and n2=0 in Formula (1)), 100% by mole of the constituent unit represented by Formula (1) with respect to the total constituent units, terminal: modification of both terminals with methacrylate, the number of functional groups: 4, number average molecular weight: 2000), 50 parts Polymerization initiator (trade name: DAROCURE 1173, manufactured by BASF Japan Ltd.), 0.5 part Solvent: (name of compound: methyl ethyl ketone) 50 parts Formation of Surface Protective Film (Crosslinking Polymerization)

A polyimide film with a thickness of 90 μm is coated (cast) with the above-described coating liquid, and the solvent is volatilized by drying the film at 80° C. for 5 minutes, and then irradiation with ultraviolet rays is performed with an ultraviolet curing apparatus, thereby obtaining a curing film. The irradiation of ultraviolet rays is performed using a high pressure mercury lamp with an intensity of 1000 mmJ/cm$^2$ under a nitrogen atmosphere (an oxygen concentration of 1% or less).

Example 2

A surface protective film is formed using the method described in Example 1 except that 25 parts of a crosslinking agent (ethoxylated isocyanuric acid triacrylate) is added and the amount of the solvent (methylethylketone) is changed to 75 parts.

Example 3

A surface protective film is formed using the method described in Example 1 except that 200 parts of a crosslinking agent (ethoxylated isocyanuric acid triacrylate) is added and the amount of the solvent (methylethylketone) is changed to 300 parts.

Example 4

50 parts of perfluoroalkylene ether D10H (manufactured by Solvay Chemicals, structure/main chain: copolymerization of a unit (n1=1 and n2=0 in Formula (1)) and a unit (n1=2 and n2=0 in Formula (1)), number average molecular weight: 1500) having alcohol (hydroxyl group) at both terminals is dissolved in 50 parts of THF, and 10 parts of 2-isocyanatoethyl methacrylate and 0.1 part of stannous octylate are added thereto while the solution is being stirred. After the resultant is stirred at 60° C. for 5 hours, the reaction liquid is washed with water and ethyl acetate and 44 parts of perfluoroalkylene ether with both terminals modified with urethane-containing methacrylate is obtained. It is confirmed that the structure has a peak for methacrylate and a urethane bond using IR.

0.5 part of DAROCURE 1173 (polymerization initiator) is added thereto, and a polyimide film with a thickness of 90 μm is coated (cast) with the resultant, and the solvent is volatilized by drying the film at 80° C. for 5 minutes, and then irradiation with ultraviolet rays is performed with an ultraviolet curing apparatus, thereby obtaining a curing film. The irradiation of ultraviolet rays is performed using a high pressure mercury lamp with an intensity of 1000 mmJ/cm$^2$ under a nitrogen atmosphere (an oxygen concentration of 1% or less).

Example 5

50 parts of perfluoroalkylene ether D10H (manufactured by Solvay Chemicals) having alcohol (hydroxyl group) at both terminals is dissolved in 50 parts of THF, and 2 parts of sodium hydride is gradually added thereto with attention not to generate foaming while the solution is being stirred. After the resultant is stirred for 30 minutes, 8 parts of acryloyl chloride is added thereto. Subsequently, remaining sodium hydride is decomposed by adding water thereto after stirring for 5 hours at room temperature, and the reaction liquid is washed off with water, thereby obtaining 46 parts of perfluoroalkylene ether with both terminals modified with acrylate.

0.5 part of DAROCURE 1173 (polymerization initiator) is added thereto, and a polyimide film with a thickness of 90 μm is coated (cast) with the resultant, and the solvent is volatilized by drying the film at 80° C. for 5 minutes, and then irradiation with ultraviolet rays is performed with an ultraviolet curing apparatus, thereby obtaining a curing film. The irradiation of ultraviolet rays is performed using a high pressure mercury lamp with an intensity of 1000 mmJ/cm$^2$ under a nitrogen atmosphere (an oxygen concentration of 1% or less).

Example 6

50 parts of a perfluoroalkylene ether compound with the following structure having alcohol (hydroxyl group) at both terminals is dissolved in 50 parts of THF, and 36 parts of triethylamine and 23 parts of acryloly chloride are added thereto while the solution is being stirred. Subsequently, the reaction liquid is washed off with water after stirring at room temperature for 5 hours, thereby obtaining 51 parts of perfluoroalkylene ether with both terminals modified with acrylate.

[Chem. 9]

0.5 part of DAROCURE 1173 (polymerization initiator) is added thereto, and a polyimide film with a thickness of 90 μm is coated (cast) with the resultant, and the solvent is volatilized by drying the film at 80° C. for 5 minutes, and then irradiation with ultraviolet rays is performed with an ultraviolet curing apparatus, thereby obtaining a curing film. The irradiation of ultraviolet rays is performed using a high pressure mercury lamp with an intensity of 1000 mmJ/cm² under a nitrogen atmosphere (an oxygen concentration of 1% or less).

Comparative Example 1

20 parts of THF is added to 50 parts of perfluoroalkylene ether D4000 (manufactured by Solvay Chemicals, structure/main chain: copolymerization of a unit (n1=1 and n2=0 in Formula (1)) and a unit (n1=2 and n2=0 in Formula (1)), number average molecular weight: 4000) having alcohol (hydroxyl group) at both terminals, and 5 parts of 2-isocyanatoethyl methacrylate and 0.1 part of stannous octylate are added thereto while the solution is being stirred. The reaction liquid is washed with water and ethyl acetate after the resultant is stirred at 60° C. for 5 hours, and 48 parts of perfluoroalkylene ether with both terminals modified with urethane-containing methacrylate is obtained.

0.5 part of DAROCURE 1173 (polymerization initiator) is added thereto, and a polyimide film with a thickness of 90 μm is coated (cast) with the resultant, and the solvent is volatilized by drying the film at 80° C. for 5 minutes, and then irradiation with ultraviolet rays is performed with an ultraviolet curing apparatus, thereby obtaining a curing film. The irradiation of ultraviolet rays is performed using a high pressure mercury lamp with an intensity of 1000 mmJ/cm² under a nitrogen atmosphere (an oxygen concentration of 1% or less).

Comparative Example 2

20 parts of THF is added to 50 parts of perfluoroalkylene ether D4000 (manufactured by Solvay Chemicals) having alcohol (hydroxyl group) at both terminals, and 1 part of sodium hydride is gradually added thereto with attention not to generate foaming while the solution is being stirred. 4 parts of acryloyl chloride is added thereto after the resultant is stirred for 30 minutes. Subsequently, remaining sodium hydride is decomposed by adding water thereto after stirring for 5 hours at room temperature, the reaction liquid is washed off with water, thereby obtaining 45 parts of perfluoroalkylene ether with both terminals modified with acrylate.

0.5 part of DAROCURE 1173 (polymerization initiator) is added thereto, and a polyimide film with a thickness of 90 μm is coated (cast) with the resultant, and the solvent is volatilized by drying the film at 80° C. for 5 minutes, and then irradiation with ultraviolet rays is performed with an ultraviolet curing apparatus, thereby obtaining a curing film. The irradiation of ultraviolet rays is performed using a high pressure mercury lamp with an intensity of 1000 mmJ/cm² under a nitrogen atmosphere (an oxygen concentration of 1% or less).

Evaluation

With regard to the samples of the protective film formed in Examples and Comparative Examples, a test is performed for a self-repairing property, a stationary contact angle, scratch resistance, and a toner peeling property using the following method. In addition, dynamic viscoelasticity measurement is performed using the above-described method, and the storage elastic modulus E'$_{40}$ and the crosslinking density n at dynamic glass transition temperatures Tg and Tg 40 K are measured or calculated using the above-described method.

Self-Repairing Property (Measurement of Return Rate)

The return rate is measured using the above-described method. The measurement results are listed in Table 1 below.

Measurement of Contact Angle

The contact angles of the resin layer samples obtained in Examples and Comparative Examples are measured using water or hexadecane. In addition, the measurement of the contact angle is performed using a contact angle meter (Kyowa Interface Science Co., Ltd., model: CA-S roll-type) by a θ/2 method at 25° C. The results are listed in the Table.

Scratch Resistance

With regard to the resin layer samples obtained in Examples and Comparative Examples above, the loads are measured until scratches are repaired after performing scratch evaluation at 100° C. using a scratch hardness meter (manufactured by ERICHSEN company, diameter of tip: 0.75 mm). The scratch resistance of the samples increases as the loads become larger.

Toner Peeling Property

The fixation of the toner is confirmed by attaching a polyimide film, on which the resin layer samples is formed, on a surface of a fixing roll of a fixing machine and passing paper of a black unfixed solid image. In addition, DocuCentre C2101 (trade name, manufactured by Fuji Xerox Co., Ltd.) is used as the fixing machine. The evaluation criteria are as follows, and the results are listed in the Table.

C: toner is adhered to the entire surface of the resin layer sample

B: toner is adhered to about half of the surface of the resin layer sample

A: toner is not adhered to the resin layer sample

TABLE 1

| | | Amount of crosslinkable group | Molecular weight of fluorine resin | Terminal modified crosslinkable group | Number of functional group of crosslinkable group | Crosslinking agent | Martens hardness N/mm² | Contact angle | |
|---|---|---|---|---|---|---|---|---|---|
| | | | | | | | | Water | Hexadecane |
| Examples | 1 | 1.60 | 2000 | methacrylate | 4 | Not present | 26.0 | 110 | 70 |
| | 2 | 2.51 | 2000 | methacrylate | 4 | Present | 67.7 | 110 | 70 |
| | 3 | 5.26 | 2000 | methacrylate | 4 | Present | 160.0 | 110 | 70 |
| | 4 | 1.03 | 1500 | methacrylate | 2 | Not present | 8.0 | 110 | 70 |
| | 5 | 1.14 | 1500 | acrylate | 2 | Not present | 15.0 | 110 | 70 |

TABLE 1-continued

|  |  |  |  |  |  |  |  |  |  |
|---|---|---|---|---|---|---|---|---|---|
|  | 6 | 3.85 | 450 | acrylate | 2 | Not present | 45.5 | 108 | 68 |
| Comparative | 1 | 0.46 | 4000 | methacrylate | 2 | Not present | 1.4 | 110 | 70 |
| Examples | 2 | 0.49 | 4000 | methacrylate | 2 | Not present | 1.5 | 110 | 70 |

|  |  |  | Dynamic viscoelasticity | | | Evaluation | | |
|---|---|---|---|---|---|---|---|---|
|  |  |  | | | Storage | | | |
|  |  |  | Tg [° C.] | Tg + 40 [K] | elasticity $E'_{40}$ at Tg + 40 K [MPa] | Crosslinking density n mol/cm$^3$ | Scratch resistance N | Return rate | Toner peeling property |
| Examples | 1 | 105 | 418 | 29 | 0.0227 | 3.0 | 92% | A |
|  | 2 | 154 | 467 | 341 | 0.2385 | 2.1 | 86% | A |
|  | 3 | 198 | 511 | 858 | 0.5486 | 1.1 | 79% | A |
|  | 4 | 58 | 371 | 25 | 0.0220 | 1.1 | 91% | B |
|  | 5 | 31 | 344 | 11 | 0.0104 | 1.6 | 90% | A |
|  | 6 | 186 | 499 | 660 | 0.4321 | 1.8 | 90% | A |
| Comparative | 1 | 48 | 361 | 8 | 0.0076 | 0.2 | 78% | C |
| Examples | 2 | 60 | 373 | 9 | 0.0081 | 0.3 | 78% | C |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A surface protective film comprising:
   a structure in which a fluorine resin having a perfluoroalkylene ether structure in a main chain has a crosslinked polymerized structure,
   wherein a storage elastic modulus E' of the protective film is in the range of 10 MPa to 1000 MPa at a temperature which is 40 K higher than a dynamic glass transition temperature Tg in dynamic viscoelasticity measurement at a measurement frequency of 10 Hz.

2. The surface protective film according to claim 1, wherein crosslinking density n calculated from Expression (A) below is 0.01 mol/cm$^3$ or more:

$$n = E'(T)/3RT \qquad \text{Expression (A):}$$

wherein E'(T) represents a storage elastic modulus E' (unit: dyne/cm$^2$), R represents a gas constant, and T represents a temperature (unit: K) which is 40 K higher than the dynamic glass transition temperature Tg.

3. The surface protective film according to claim 1, wherein an amount of a crosslinkable group is 0.50 mmol/g or more.

4. The surface protective film according to claim 2, wherein an amount of a crosslinkable group is 0.50 mmol/g or more.

5. The surface protective film according to claim 1, wherein Martens hardness at 25° C. is in the range of 15 N/mm$^2$ to 150 N/mm$^2$.

6. The surface protective film according to claim 2, wherein Martens hardness at 25° C. is in the range of 15 N/mm$^2$ to 150 N/mm$^2$.

7. The surface protective film according to claim 3, wherein Martens hardness at 25° C. is in the range of 15 N/mm$^2$ to 150 N/mm$^2$.

8. The surface protective film according to claim 4, wherein Martens hardness at 25° C. is in the range of 15 N/mm$^2$ to 150 N/mm$^2$.

9. The surface protective film according to claim 1, wherein the fluorine resin includes at least one kind of structure selected from the structure represented by Formula (1) below:

[Chem. 1]

Formula (1)

wherein R$^1$ and R$^2$ independently represent a fluorine atom or —CF$_3$ respectively, provided that both of R$^1$ and R$^2$ are not fluorine atoms; n1 represents an integer of 1 to 5; and n2 represents an integer of 0 to 2, and the total of n1 and n2 is 5 or less.

10. The surface protective film according to claim 2, wherein the fluorine resin includes at least one kind of structure selected from the structure represented by Formula (1) below:

[Chem. 1]

Formula (1)

wherein R$^1$ and R$^2$ independently represent a fluorine atom or —CF$_3$ respectively, provided that both of R$^1$ and R$^2$ are not fluorine atoms; n1 represents an integer of 1 to 5; and n2 represents an integer of 0 to 2, and the total of n1 and n2 is 5 or less.

11. The surface protective film according to claim 3, wherein the fluorine resin includes at least one kind of structure selected from the structure represented by Formula (1) below:

[Chem. 1]

Formula (1)

wherein $R^1$ and $R^2$ independently represent a fluorine atom or $—CF_3$ respectively, provided that both of $R^1$ and $R^2$ are not fluorine atoms; n1 represents an integer of 1 to 5; and n2 represents an integer of 0 to 2, and the total of n1 and n2 is 5 or less.

12. The surface protective film according to claim 4, wherein the fluorine resin includes at least one kind of structure selected from the structure represented by Formula (1) below:

[Chem. 1]

Formula (1)

wherein $R^1$ and $R^2$ independently represent a fluorine atom or $—CF_3$ respectively, provided that both of $R^1$ and $R^2$ are not fluorine atoms; n1 represents an integer of 1 to 5; and n2 represents an integer of 0 to 2, and the total of n1 and n2 is 5 or less.

13. The surface protective film according to claim 5, wherein the fluorine resin includes at least one kind of structure selected from the structure represented by Formula (1) below:

[Chem. 1]

Formula (1)

wherein $R^1$ and $R^2$ independently represent a fluorine atom or $—CF_3$ respectively, provided that both of $R^1$ and $R^2$ are not fluorine atoms; n1 represents an integer of 1 to 5; and n2 represents an integer of 0 to 2, and the total of n1 and n2 is 5 or less.

14. The surface protective film according to claim 6, wherein the fluorine resin includes at least one kind of structure selected from the structure represented by Formula (1) below:

[Chem. 1]

Formula (1)

wherein $R^1$ and $R^2$ independently represent a fluorine atom or $—CF_3$ respectively, provided that both of $R^1$ and $R^2$ are not fluorine atoms; n1 represents an integer of 1 to 5; and n2 represents an integer of 0 to 2, and the total of n1 and n2 is 5 or less.

15. The surface protective film according to claim 7, wherein the fluorine resin includes at least one kind of structure selected from the structure represented by Formula (1) below:

[Chem. 1]

Formula (1)

wherein $R^1$ and $R^2$ independently represent a fluorine atom or $—CF_3$ respectively, provided that both of $R^1$ and $R^2$ are not fluorine atoms; n1 represents an integer of 1 to 5; and n2 represents an integer of 0 to 2, and the total of n1 and n2 is 5 or less.

16. The surface protective film according to claim 8, wherein the fluorine resin includes at least one kind of structure selected from the structure represented by Formula (1) below:

[Chem. 1]

Formula (1)

wherein $R^1$ and $R^2$ independently represent a fluorine atom or $—CF_3$ respectively, provided that both of $R^1$ and $R^2$ are not fluorine atoms; n1 represents an integer of 1 to 5; and n2 represents an integer of 0 to 2, and the total of n1 and n2 is 5 or less.

17. The surface protective film according to claim 1, wherein a terminal of the main chain of the fluorine resin is a resin that is modified with at least one group selected from an epoxy group, an acrylic group ($CH_2$=CH—CO—), a methacrylic group ($CH_2$=C($CH_3$)—CO—), a hydroxyl group, an amino group, an ester group, a carboxyl group, a thiol group, a trialkoxysilyl group, and a group containing these groups.

18. The surface protective film according to claim 1, wherein the terminal of the main chain of the fluorine resin is modified with a functional crosslinkable group, and the number of functional groups of the crosslinkable group is from 2 to 10.

19. The surface protective film according to claim 2, wherein the terminal of the main chain of the fluorine resin is modified with a functional crosslinkable group, and the number of functional groups of the crosslinkable group is from 2 to 10.

20. The surface protective film according to claim 1, further comprising a structure in which the fluorine resin has a crosslinked polymerized structure through a crosslinking agent.

* * * * *